United States Patent
Chen et al.

(10) Patent No.: US 10,798,536 B2
(45) Date of Patent: Oct. 6, 2020

(54) METHOD, SYSTEM, AND DEVICE FOR PROCESSING SYSTEM CALL IN VOICE CALL

(71) Applicant: TENCENT TECHNOLOGY (SHENZHEN) COMPANY LIMITED, Shenzhen (CN)

(72) Inventors: Xiaobo Chen, Shenzhen (CN); Chi Xi, Shenzhen (CN); Bin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 193 days.

(21) Appl. No.: 15/868,815

(22) Filed: Jan. 11, 2018

(65) Prior Publication Data

US 2018/0132076 A1    May 10, 2018

Related U.S. Application Data

(63) Continuation of application No. PCT/CN2016/097777, filed on Sep. 1, 2016.

(30) Foreign Application Priority Data

Sep. 16, 2015 (CN) .......................... 2015 1 0590645

(51) Int. Cl.
*H04W 4/16* (2009.01)
*H04M 3/428* (2006.01)
*H04M 3/48* (2006.01)

(52) U.S. Cl.
CPC ............. *H04W 4/16* (2013.01); *H04M 3/428* (2013.01); *H04M 3/48* (2013.01); *H04M 2201/16* (2013.01)

(58) Field of Classification Search
CPC ....... H04W 88/06; H04W 4/16; H04W 76/19; H04W 76/20; H04W 76/25; H04M 3/428; H04M 3/4288
See application file for complete search history.

(56) References Cited

U.S. PATENT DOCUMENTS 6,560,239 B1 * 5/2003 Frid ...................... H04M 3/428
370/216
8,335,499 B1 * 12/2012 Zhao ...................... H04W 4/00
455/418

(Continued)

FOREIGN PATENT DOCUMENTS

CN     102572101 A    7/2012
CN     103249104 A    8/2013

(Continued)

OTHER PUBLICATIONS

Google Patents Translation of Document N; CN-104394269-A, Yu Fei et al. (Year: 2015).*

(Continued)

*Primary Examiner* — Matthew C Sams
(74) *Attorney, Agent, or Firm* — Anova Law Group, PLLC

(57) ABSTRACT

The present disclosure provides a method for processing a system call in a voice call. The method includes: participating, by a first terminal, a voice call with one or more second terminals, the voice call being performed in a non-system voice call application on the first terminal; monitoring, by the first terminal, a system call start event during the voice call; actively stopping, in response to the system call start event, use of an audio device of the first terminal; suspending participation of the first terminal in the voice call; sending, by the first terminal, a voice suspension request to a server to remind the one or more second terminals that the (Continued)

first terminal suspends the voice call; and recovering the voice call when the system call ends.

16 Claims, 13 Drawing Sheets

(56) References Cited

U.S. PATENT DOCUMENTS

| | | | | |
|---|---|---|---|---|
| 8,874,069 | B1* | 10/2014 | Zhao | H04W 4/90 |
| | | | | 455/404.1 |
| 8,984,067 | B2* | 3/2015 | Lau | H04L 65/1083 |
| | | | | 709/206 |
| 9,066,330 | B2* | 6/2015 | Hang | H04W 76/19 |
| 9,402,124 | B2* | 7/2016 | Zhang | H04R 1/1041 |
| 10,277,749 | B2* | 4/2019 | Frazier | H04M 7/006 |
| 2003/0061622 | A1* | 3/2003 | Nebiker | H04L 51/36 |
| | | | | 725/117 |
| 2004/0120473 | A1 | 6/2004 | Birch et al. | |
| 2005/0063359 | A1* | 3/2005 | Jagadeesan | H04M 3/42314 |
| | | | | 370/352 |
| 2005/0124326 | A1* | 6/2005 | Belkin | H04W 4/16 |
| | | | | 455/414.1 |
| 2005/0190747 | A1* | 9/2005 | Sindhwani | H04W 88/06 |
| | | | | 370/352 |
| 2005/0271020 | A1* | 12/2005 | Thermond | H04L 29/06027 |
| | | | | 370/338 |
| 2006/0126803 | A1 | 6/2006 | Patel et al. | |
| 2007/0142047 | A1* | 6/2007 | Heeschen | H04W 68/12 |
| | | | | 455/435.1 |
| 2008/0014938 | A1* | 1/2008 | Hart | H04W 76/20 |
| | | | | 455/435.1 |
| 2008/0280639 | A1* | 11/2008 | Alfia | H04M 1/72519 |
| | | | | 455/551 |
| 2009/0021574 | A1* | 1/2009 | Iwami | H04N 5/44 |
| | | | | 348/14.04 |
| 2009/0131045 | A1* | 5/2009 | Feuer | H04W 76/10 |
| | | | | 455/426.1 |
| 2010/0124211 | A1* | 5/2010 | Payyappilly | H04W 76/25 |
| | | | | 370/338 |
| 2012/0019610 | A1* | 1/2012 | Hornyak | H04M 1/2535 |
| | | | | 348/14.02 |
| 2013/0316679 | A1* | 11/2013 | Miller | H04M 1/6041 |
| | | | | 455/412.1 |
| 2014/0063175 | A1* | 3/2014 | Jafry | H04M 1/67 |
| | | | | 348/14.02 |
| 2014/0273974 | A1* | 9/2014 | Varghese | H04M 3/42246 |
| | | | | 455/412.1 |
| 2015/0281458 | A1* | 10/2015 | Bianco | H04M 3/53366 |
| | | | | 370/259 |
| 2016/0088674 | A1* | 3/2016 | Kotreka | H04W 36/0022 |
| | | | | 370/329 |
| 2016/0173683 | A1* | 6/2016 | Abreu | H04L 51/24 |
| | | | | 455/414.1 |
| 2017/0230500 | A1* | 8/2017 | Serna Pozuelo | H04M 3/42153 |
| 2017/0374600 | A1* | 12/2017 | Lantz | H04W 4/12 |
| 2018/0049095 | A1* | 2/2018 | Mishra | H04W 40/02 |
| 2018/0063881 | A1* | 3/2018 | Shah | H04B 17/318 |
| 2018/0288228 | A1* | 10/2018 | Frazier | H04M 7/006 |

FOREIGN PATENT DOCUMENTS

| | | | |
|---|---|---|---|
| CN | 104394269 A | * | 3/2015 |
| CN | 104394269 A | | 3/2015 |
| CN | 104902115 A | | 9/2015 |
| CN | 105262911 A | | 1/2016 |
| EP | 2974250 B1 | * | 2/2017 |
| JP | H06141084 A | | 5/1994 |
| JP | 2005020676 A | | 1/2005 |
| JP | 2006139630 A | | 6/2006 |
| JP | 2011228854 A | | 11/2011 |
| JP | 2012138789 A | | 7/2012 |
| KR | 0677362 B | | 2/2007 |
| KR | 20070047611 A | | 5/2007 |
| KR | 20090010506 A | | 1/2009 |
| KR | 0934603 B | | 12/2009 |

OTHER PUBLICATIONS

The Japan Patent Office (JPO) Office Action 1 for Application No. 2018-503148 dated Mar. 5, 2019 13 Pages (including translation).
The World Intellectual Property Organization (WIPO) International Search Report for PCT/CN2016/097777 dated Nov. 28, 2016 6 Pages (including translation).
The State Intellectual Property Office of the People's Republic of China (SIPO) Office Action 1 for 201510590645.X dated Sep. 4, 2017 8 Pages (including translation).
The Japan Patent Office (JPO) Notification of Reasons for Refusal for Application No. 2018-503148 and Translation dated Sep. 17, 2019 10 Pages.
Korean Intellectual Property Office (KIPO) Office Action 1 for 20187002155 dated Oct. 16, 2019 11 Pages (including translation).

* cited by examiner

METHOD, SYSTEM, AND DEVICE FOR PROCESSING SYSTEM CALL IN VOICE CALL

CROSS-REFERENCES TO RELATED APPLICATIONS

This application is a continuation application of PCT Patent Application No. PCT/CN2016/097777, filed on Sep. 1, 2016, claims priority to Chinese Patent Application No. 201510590645.X, entitled "METHOD, SYSTEM, AND DEVICE FOR PROCESSING SYSTEM CALL IN VOICE CALL" filed with the Chinese Patent Office on Sep. 16, 2015, the entire contents of both of which are incorporated herein by reference.

FIELD OF THE TECHNOLOGY

This application relates to the technical field of mobile Internet applications, and in particular to a method, system, and device for processing a system call in a voice call.

BACKGROUND OF THE DISCLOSURE

With development of mobile Internet, most mobile terminals, for example, a smartphone, have only one audio device. For this audio device, a system call has a highest priority for occupying the audio device. That is, in the mobile terminal, no matter which application occupies the audio device, once a system call is received, the application currently occupying the audio device would be suspended, and the system call race to exclusively occupy the audio device at the highest priority.

A voice call application in a mobile device achieves a network calling function by using a data network. Therefore, when the voice call is performed, any calling party terminal participating in the voice call may automatically end, once the system call is listened, the currently performed voice call because the system call occupies the audio device. As a result, the implementation of the voice call is interfered with by the system call, and the voice call between the calling party terminals is frequently ended and reinitiated. Therefore, smooth of the voice call is significantly affected.

SUMMARY

An objective of this application is overcoming a defect in the existing technology that a calling party terminal has to end a currently performed voice call because of a system call, and therefore, smooth of the voice call is significantly affected.

Another objective of this application is providing a method, system, and device for processing a system call in a voice call in which a calling party terminal would not end a voice call because of a system call, thereby ensuring smooth of the voice call.

One aspect of the present disclosure provides a method for processing a system call in a voice call, including: participating, by a first terminal, in a voice call with one or more second terminals, the voice call being performed in a non-system voice call application on the first terminal; monitoring, by the first terminal, a system call start event during the voice call; actively stopping, in response to the system call start event, use of an audio device of the first terminal; suspending participation of the first terminal in the voice call; sending, by the first terminal, a voice suspension request to a server to remind the one or more second terminals that the first terminal suspends the voice call; and recovering the voice call when the system call ends.

Another aspect of the present disclosure provides a method for processing a voice call, including: facilitating, by a server, a voice call between a first terminal and one or more second terminals; receiving, by the server, a voice suspension request from the first terminal, the voice suspension request being generated by the first terminal in response to a system call start event; reminding, by the server, according to the received voice suspension request, the one or more second terminals that participation of the first terminal in the voice call is suspended.

Another aspect of the present disclosure provides a first terminal for processing a system call in a voice call, including an audio device, a memory and a processor coupled to the memory. The processor is configured for participating in a voice call with one or more second terminals, the voice call being performed in a non-system voice call application on the first terminal; monitoring a system call start event during the voice call; actively stopping, in response to the system call start event, use of the audio device of the first terminal; suspending participation of the first terminal in the voice call; sending a voice suspension request to a server to remind the one or more second terminals that the first terminal suspends the voice call; and recovering the voice call when the system call ends.

Another aspect of the present disclosure provides a server for processing a voice call, including a memory and a processor coupled to the memory. The processor is configured for: facilitating a voice call between a first terminal and one or more second terminals; receiving a voice suspension request from the first terminal, the voice suspension request being generated by the first terminal in response to a system call start event; and reminding according to the received voice suspension request, the one or more second terminals that participation of the first terminal in the voice call is suspended.

DESCRIPTION OF EMBODIMENTS

Figure 1:
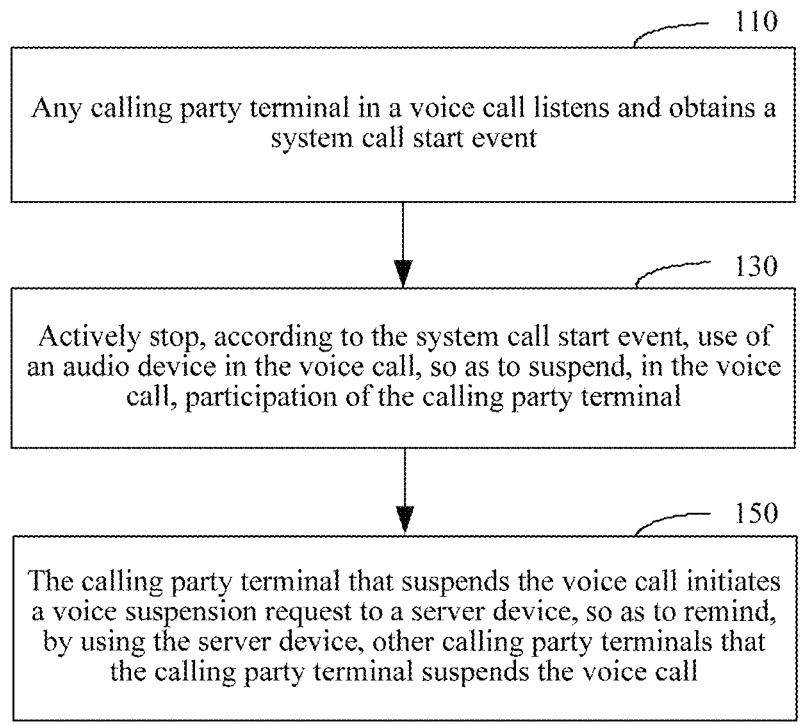
FIG. 1 is a flowchart of a method for processing a system call in a voice call according to an embodiment.

In an embodiment, a method for processing a system call in a voice call is shown in FIG. 1, and includes the following steps.

Step S110: Any calling party terminal in a voice call listens and obtains a system call start event. In other words, a calling party terminal, while participating in a voice call with other calling party terminals, constantly monitors whether a system call start event occurs.

The voice call refers to a communication process achieved by that a data network transmits voice data, for example, an VOIP (Voice over Internet Protocol) network call. Two or more users participate in the voice call by using the voice call in respective mobile terminals of the users. The voice call application in which any user is located serves as a client that is in the mobile terminal and that is configured to achieve the voice call, and becomes a calling party terminal in the voice call.

The mobile terminal has a function of transmitting the voice data by means of a voice network, that is, a phone function provided by an operator. Through the phone function, when the mobile terminal changes into an incoming call state or an outgoing call state, a system call start event is triggered, and the voice call application currently performing the voice call in the mobile terminal is notified. For example, the mobile terminal can install a non-system voice call application. The voice call is performed in the non-system voice call application.

Specifically, an operating system of the mobile terminal provides an interface for listening for state changes of the system call, for example, a TelephonyManager (PhoneStateListener.LISTEN_CALL_STATE) interface in an Android operating system or a CTCallCenter (CTCall) interface in an iOS operating system.

A system call event triggered when a system call state changes is learned by using a listening interface about state changes of a registered system call. The system call event includes a system call start event and a system call end event. The system call start event is triggered when the system call state is the incoming call state or the outgoing call state. The system call end event is triggered when the system call is in a hung up state.

When the interface provided by the operating system of the mobile terminal listens and obtains the system call start event, the voice call application that currently performs the voice call, that is, the foregoing calling party terminal that performs the voice call, is called back and notified. Therefore, the calling party terminal that performs the voice call listens for the system call start event occurs thereto.

Step S130: Actively stop, according to the system call start event (i.e., in response to the system call start event), use of an audio device in the voice call, so as to suspend, in the voice call, participation of the calling party terminal.

During a process that the calling party terminal performs the voice call, the audio device of the mobile terminal at which the calling party terminal is located is used to play voice data. As the mobile terminal at which the calling party terminal that performs the voice call is located is triggered to enter the system call, the calling party terminal actively stops using the audio device to suspend the voice call performed thereby, so as to hold the voice call and wait for end of the currently performed system call.

At this time, the audio device is occupied by the currently entered system call, so as to enter the system call when the voice call is suspended.

Step S150: The calling party terminal that suspends the voice call initiates a voice suspension request to a server device, so as to remind, by using the server device, other calling party terminals that the calling party terminal suspends the voice call.

The voice call suspended by the calling party terminal is recovered when the system call ends.

The calling party terminal entering the system call suspends the voice call. That is, although the calling party terminal holds the voice call, the calling party terminal suspends participation in the voice call. Therefore, the calling party terminal initiates the voice suspension request to a background server device.

Specifically, in the voice call, the server device performing data exchange with the calling party terminal is configured to receive and forward audio data; and to transfer, between the calling party terminals, a state in which any calling party terminal performs the voice call, for example, a suspension state of the voice call, to other calling party terminals.

With cooperation of the server device, when any calling party terminal entering the system call suspends the voice call, the server device learns, by using the voice suspension request initiated thereby, the suspension state that the calling party terminal enters the voice call, so as to remind other calling party terminals that the calling party terminal currently performing the voice call suspends the voice call because of entering the system call.

Further, the calling party terminal entering the system call stops use of the audio device to suspend the voice call performed thereby. Other calling party terminals of the voice call would not output voice of this calling party terminal. Therefore, a reminder about this is required, so that each of the other calling party terminals learns a reason that the calling party terminal suspending the voice call has no sounds. As a result, the other calling party terminals continue to perform the voice call.

In an embodiment, after step S110, the foregoing method further includes:

triggering, by using the system call start event, to stop sending voice data, where the voice data is generated when the calling party terminal performs the voice call.

The calling party terminal in this step is any calling party terminal that temporarily suspends the voice call because a system call enters the voice call. As the system call start event is triggered, the calling party terminal that temporarily suspends the voice call stops sending the voice data to each of other calling party terminals, so as to save network flow.

In an embodiment, after step S150, the foregoing method further includes:

reminding, in the server device and according to the received voice suspension request, the other calling party terminals that the participation of the calling party terminal in the voice call is suspended.

The server device that receives the voice suspension request reminds in the other calling party terminals, by issuing the prompting message, the calling party terminal that temporarily suspends the voice call. That is, other calling parties are notified that a calling party terminal currently performing the voice call enters the system call and temporarily suspends participation in the voice call. Therefore, other calling party terminals are not affected by that participation of some calling party terminals in the voice call is suspended, so as to continue the current voice call, thereby ensuring smooth of the voice call.

Figure 2:
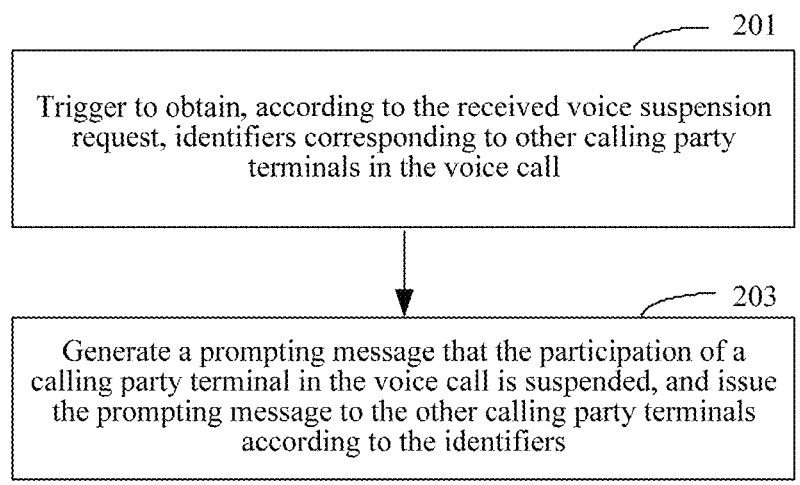
FIG. 2 is a method flowchart of reminding, in a server device and according to a received voice suspension request, other calling party terminals that participation of a calling party terminal in a voice call is suspended in FIG. 1.

Further, as shown in FIG. 2, the foregoing step of the reminding, in the server device and according to the received voice suspension request, the other calling party terminals that the participation of the calling party terminal in the voice call is suspended includes the following steps.

Step S201: Trigger to obtain, according to the received voice suspension request, identifiers corresponding to the other calling party terminals in the voice call.

In the server device, if the voice suspension request initiated by any calling party terminal is received, the voice call corresponding to the voice suspension request is triggered and determined, so as to obtain identifiers corresponding to various calling party terminals in the voice call. The identifier is used to identify data related to the calling party terminal. For example, a voice data packet, the voice suspension request, and the prompting message all distinguish a source calling party terminal and a target calling party terminal by using the identifier, so as to ensure that the voice data, the voice suspension request, and the prompting message are transferred accurately and successfully.

Step S203: Generate a prompting message that the participation of the calling party terminal in the voice call is suspended, and issue the prompting message to the other calling party terminals according to the identifiers.

The prompting message generated in and issued by the server device may be a text message and/or an audio message. The text message is used to remind that a calling party terminal in other calling party terminals continuing to perform the voice call suspends the voice call because of entering the system call. The audio message is used to remind in a form of playing audio content.

Figure 3:
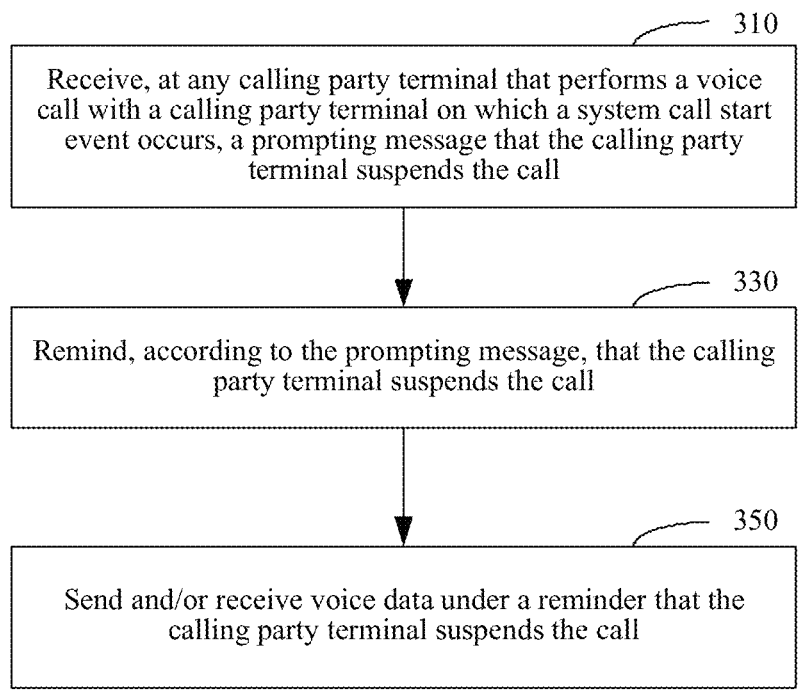
FIG. 3 is a flowchart of a method for processing a system call in a voice call according to another embodiment.

Further, as shown in FIG. 3, in this embodiment, after the foregoing step of the reminding, in the server device and according to the received voice suspension request, the other calling party terminals that the participation of the calling party terminal in the voice call is suspended, the method further includes the following steps.

Step S310: Receive, at any calling party terminal that performs the voice call with the calling party terminal on which the system call start event occurs, the prompting message that the calling party terminal suspends the call.

In the voice call, there may be one or more calling party terminals on which a system call event occurs. Relatively, there may also be one or more calling party terminals that perform the voice call with the calling party terminals on which the system call event occurs. Moreover, any calling party terminal that performs the voice call with the calling party terminals on which the system call event occurs receives the prompting message that the calling party terminal suspends the call, where the prompting message is issued by the server device.

Step S330: Remind, according to the prompting message, that the calling party terminal suspends the call.

The prompting message may be a text message and/or an audio message. Therefore, after the prompting message is received, relative prompting content is displayed or played, so that the user may learn, through viewing interface content or listening to the played content, that a calling party terminal in the currently performed voice call is temporarily suspended to enter the system call.

Step S350: Send and/or receive voice data under a reminder that the calling party terminal suspends the call.

Under the reminder that a calling party terminal suspends the call, any other calling party terminal that continue to perform the voice call continues to send and/or receive the voice data, so that the corresponding user listens speaking content of other users.

Through the process described above, in the voice call, even though a calling party terminal enters the system call due to an incoming call or an outgoing call, and therefore suspends the voice call, each of the other calling party terminals can still continue to perform the voice call. The calling party terminal that suspends the voice call does not end the voice call in which the calling party terminal participates, but still keep the voice call participated thereby. Hence, interference resulted in the voice call is possibly eliminated, thereby preventing the voice call from being frequently ended and reinitiated.

Figure 4:
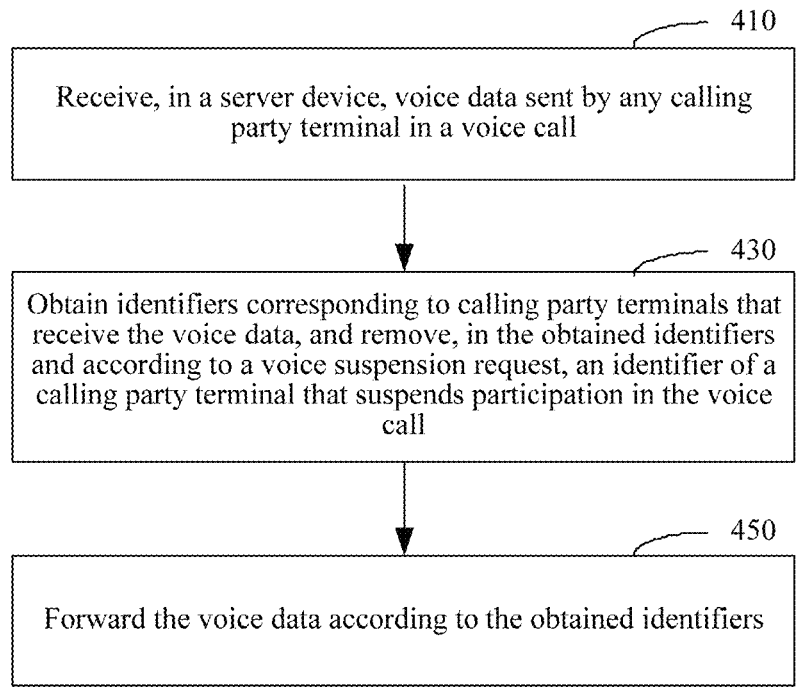
FIG. 4 is a flowchart of a method for processing a system call in a voice call according to another embodiment.

In an embodiment, as shown in FIG. 4, after step S150, the foregoing method further includes the following steps.

S410: Receive, in the server device, the voice data sent by any calling party terminal in the voice call.

In the voice call, as the voice call is performed, the server device exchanging data with each calling party terminal continuously receives the voice data sent by each calling party terminal, and forwards the received voice data to other calling party terminals, so as to transfer corresponding speaking content in the voice data.

Step S430: Obtain identifiers corresponding to calling party terminals that receive the voice data, and remove, in the obtained identifiers and according to the voice suspension request, the identifier of the calling party terminal that suspends the participation in the voice call.

Regarding that the voice data that is sent by any calling party terminal and that is received by the server device, the identifier corresponding to each other calling party terminal that receives the voice data in the voice call is obtained. These identifiers include the identifier corresponding to the calling party terminal of which the participation in the voice call is currently suspended, and therefore, this identifier is removed.

Step S450: Forward the voice data according to the obtained identifiers.

Through the process described above, when the participation of a calling party terminal in the voice call is suspended, the voice data is not sent to the server device. Moreover, regarding the server device, the voice data received thereby also would not be forwarded to the calling party terminal of which the participation in the voice call is suspended. Therefore, network flow consumed by the calling party terminal of which the participation in the voice call is suspended is greatly saved.

Figure 5:
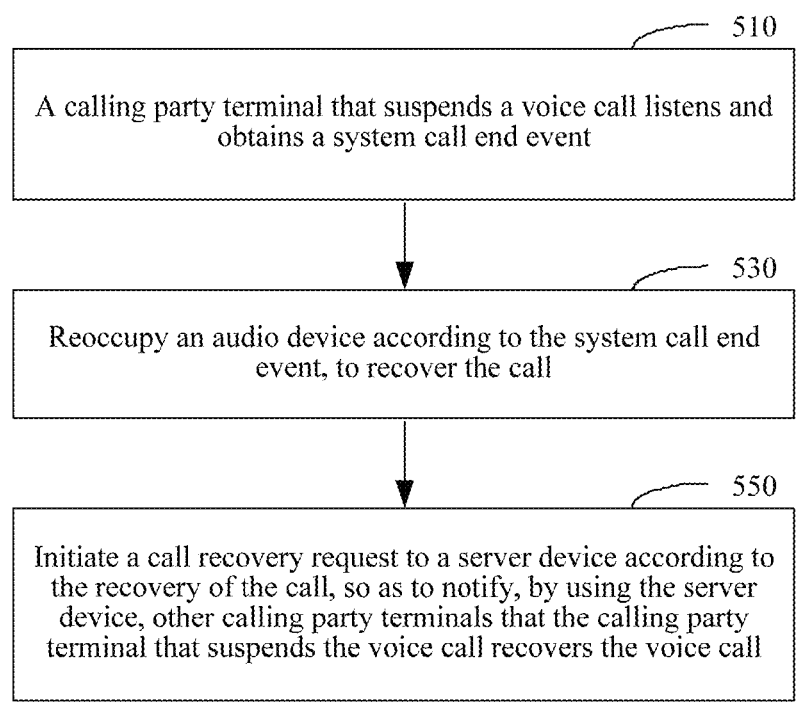
FIG. 5 is a flowchart of a method for processing a system call in a voice call according to another embodiment.

In an embodiment, as shown in FIG. 5, the foregoing method further includes the following steps.

Step S510: The calling party terminal that suspends the voice call listens and obtains a system call end event.

The system call end event is triggered when the system call is in a hung up state. The calling party terminal that currently suspends the voice call is in a process of a system call. As the connected system call is hung up, the state of the system call changes from a connected state into the hung up state.

As described above, state changes of the system call are listened by an interface provided by an operating system in which the mobile terminal is located, so as to receive the triggered system call end event.

Step S530: Reoccupy the audio device according to the system call end event, to recover the call.

The audio device is not occupied as the system call is hung up. Therefore, the voice call is controlled to reoccupy the audio device (e.g., by the non-system voice call application), so as to recover the voice call that is temporarily suspended in the calling party terminal, thereby participating in the voice call again.

Step S550: Initiate a call recovery request to the server device according to the recovery of the call, so as to notify, by using the server device, the other calling party terminals that the calling party terminal that suspends the voice call recovers the voice call.

Through the process described above, the calling party terminal that temporarily suspends the voice call due to the system call recovers the call as the system call is hung up, and is enabled to participate in the voice call again, that is, continue to send and/or receive the voice data.

At this time, the server device receives the voice data sent by the calling party terminal and forwards the voice data to other calling party terminals of the voice call.

Further, in such a scenario, as the calling party terminal that suspends the voice call recovers the call, after step S550, the foregoing method further includes:

reminding, in the server device and according to the received call recovery request, other calling party terminals that the calling party terminal participate in the voice call again; and the server device learns, according to the call recovery request, that a temporary suspension occurs on any calling party terminal in the voice call, so as to remind the other calling party terminals about this.

Correspondingly, the server device also receives the voice data sent by the calling party terminal that recovers the call, and forwards the voice data to other calling party terminals that do not suspend the voice call, thereby continuing to participate in the voice call again.

The foregoing method for processing a system call in a voice call is described in detail below with reference to a specific embodiment. The voice call performed in this embodiment includes n calling party terminals, where n is an integer not smaller than 2. Description is made by using that a system call occurs on a calling party terminal in this voice call as an example.

Figure 6:
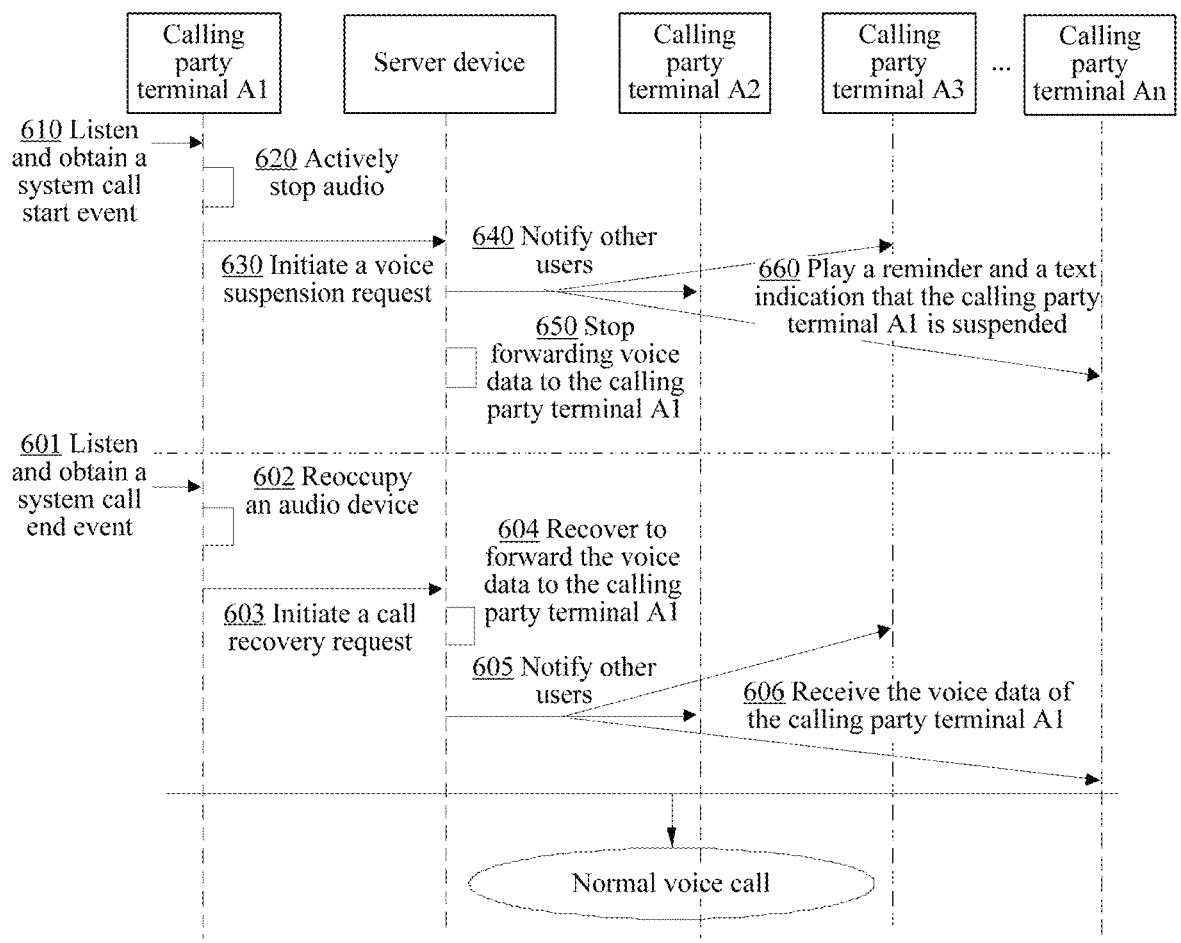
FIG. 6 is a time diagram of processing a system call in a voice call according to an embodiment.

As shown in FIG. 6, a calling party terminal A1, a calling party terminal A2, a calling party terminal A3, . . . , and An perform the voice call by using a server device. In this embodiment, the calling party terminal A1 is a calling party terminal on which the system call occurs, and the system call does not occur on the other calling party terminals during the process of the voice call.

The voice call is described below from an angle of the calling party terminal A1.

In the calling party terminal A1, a system call start event is listened as the system call occurs. In this case, use of an audio device is actively stopped, so as to temporarily suspend the currently performed voice call.

The calling party terminal A1 that temporarily suspends the voice call initiates a voice suspension request to the server device, so as to notify the server device that the calling party terminal A1 enters the system call and temporarily suspends the voice call, thereby notifying other users through the server device.

In this case, the calling party terminal A1 no longer sends voice data to the server device, and also no longer receives the voice data that is forwarded by the server device and that is from the other calling party terminals.

The calling party terminal A1 is connected and enters the system call. The voice call performed thereby may be automatically saved, so as to wait for the hung up of the system call to recover the voice call that is currently and automatically saved.

Figure 7:
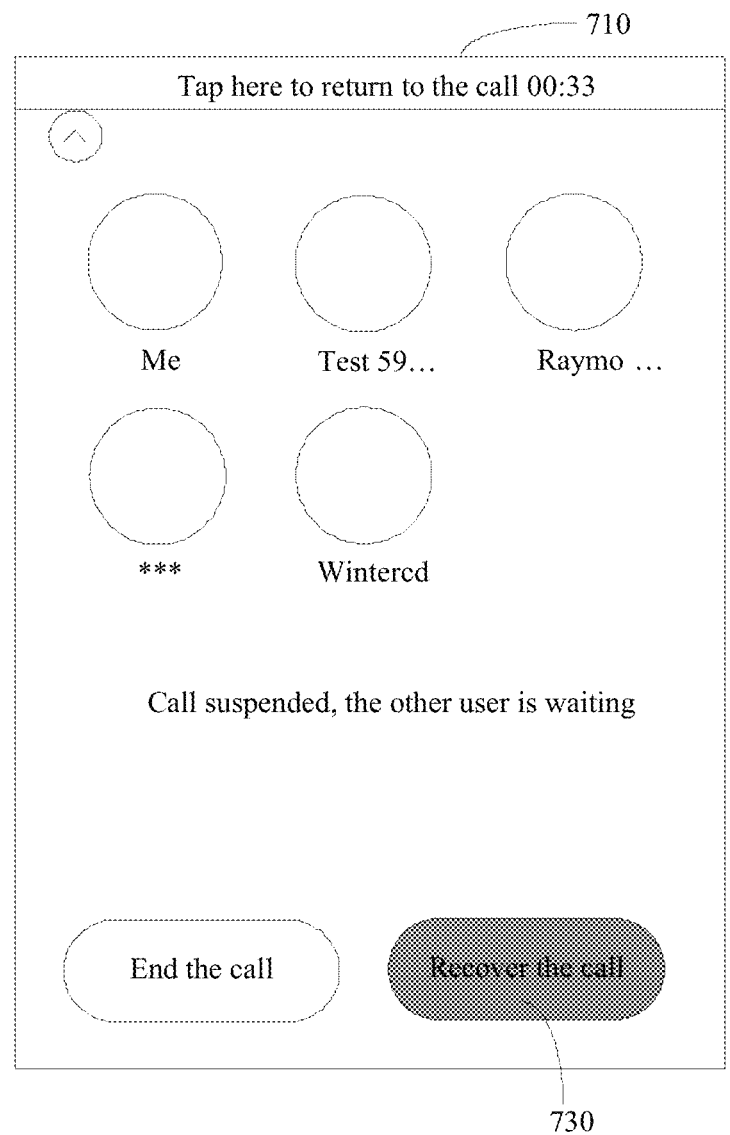
FIG. 7 is an application schematic diagram of a terminal interface when a calling party terminal enters a system call.

Specifically, as the calling party terminal A1 enters the system call, and a terminal interface corresponding to the calling party terminal A1 is shown in FIG. 7. The terminal interface is still in a voice call interface, and merely reminds, as the system call starts, in the interface that the voice call is suspended and the other calling party terminals are waiting, that is, a message "call suspended, and the other user is waiting" shown in an voice call interface 710. In this case, a call recovery button 730 is not available.

However, in another aspect, as the system call is hung up, the calling party terminal A1 listens for a system call end event. In this case, the audio device is enabled again and a call recovery request is initiated to the server device.

The server device that receives the call recovery request forwards the voice data to the calling party terminal A1, and notifies the other users. Correspondingly, the calling party terminal A1 may also recover the sending of the voice data that is performed thereby.

Figure 8:
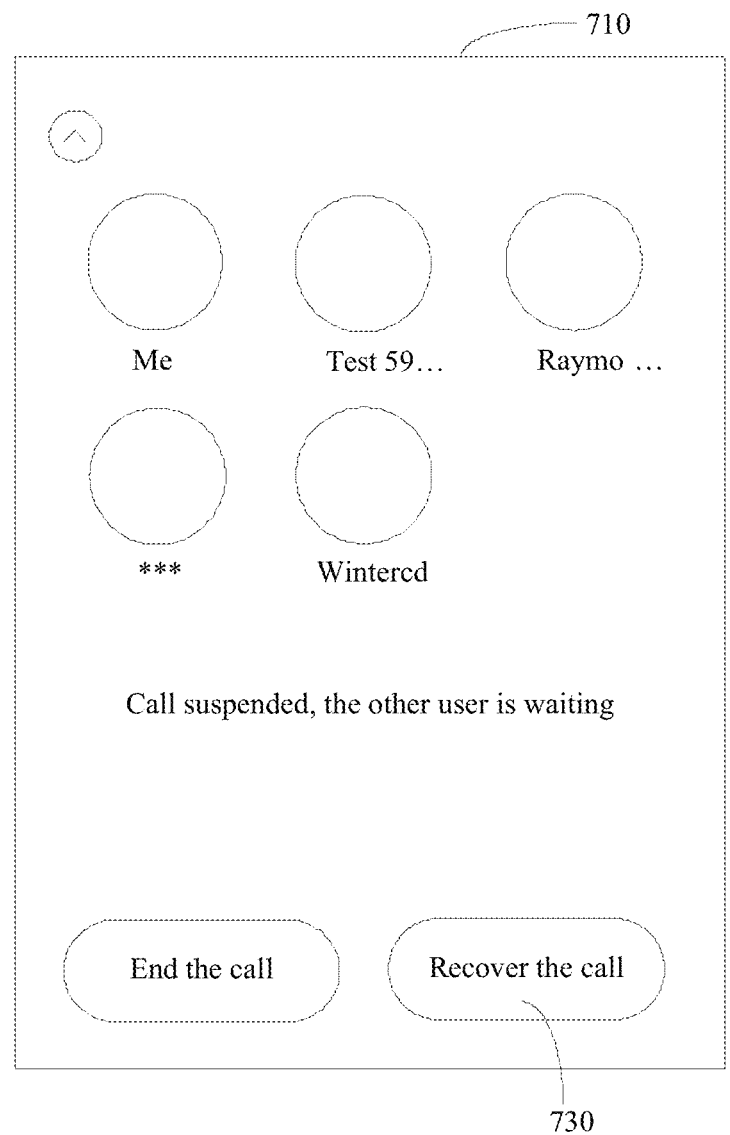
FIG. 8 is an application schematic diagram of terminal interface when a system call ends in FIG. 7.

The voice call in the calling party terminal A1 may be recovered by a manual operation, or may be recovered by automatic triggering. The manual operation refers to trigger, when the system call ends, the call recovery button 730 that becomes available, as shown in FIG. 8, so as to recover the voice call. The automatic triggering refers to automatically perform a process of recovering the voice call when the system call end event is listened.

Figure 9:
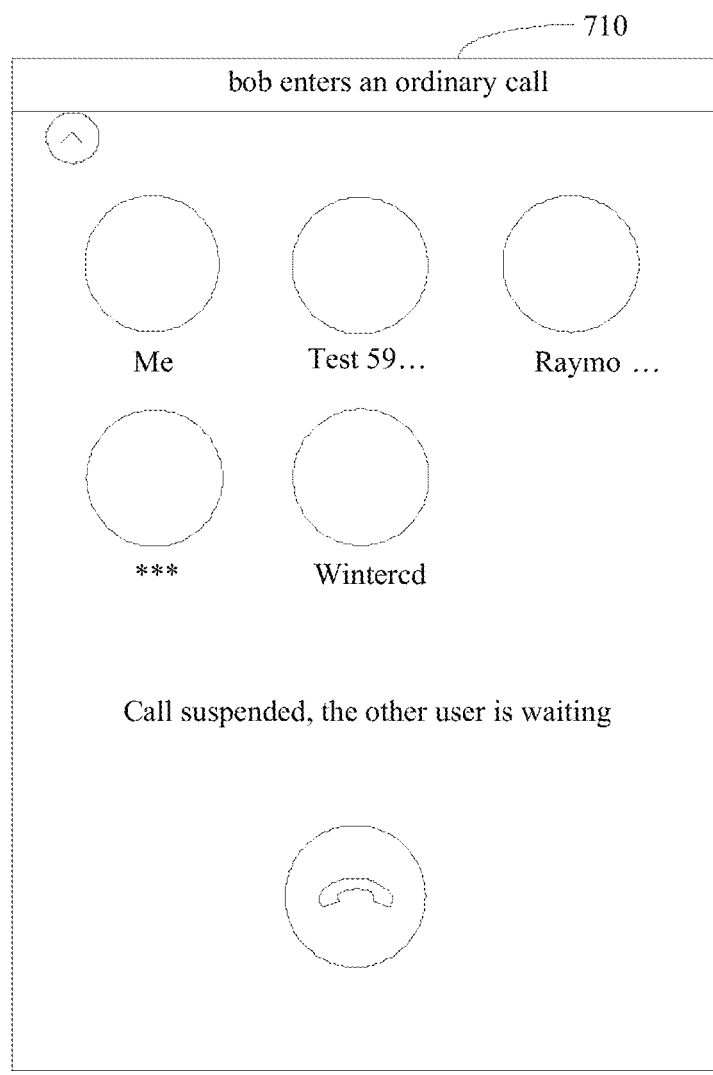
FIG. 9 is a flowchart of a method for processing a system call in a voice call according to another embodiment.
Figure 10:
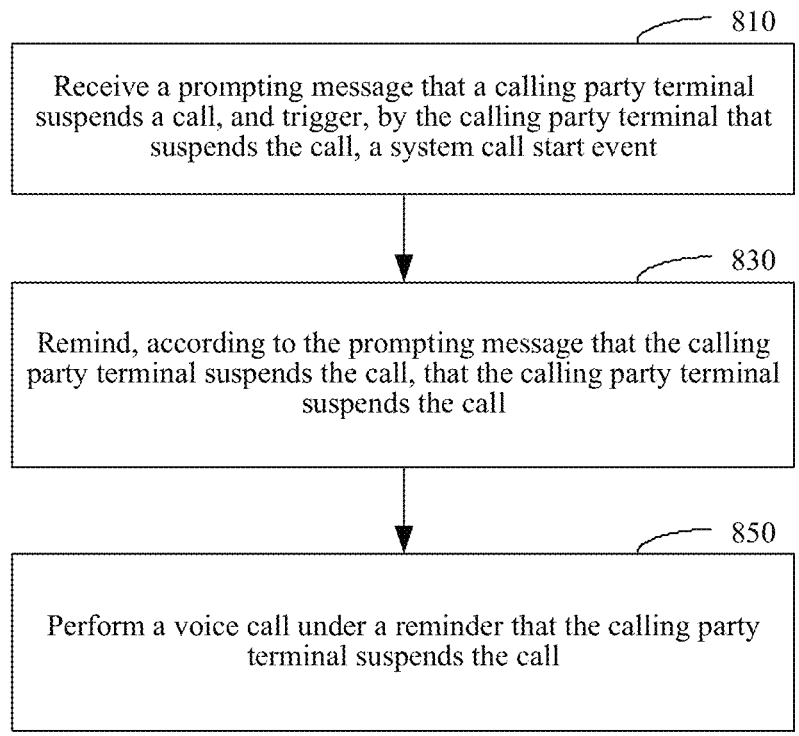
FIG. 10 is a schematic diagram of terminal interface of any other calling party terminal according to an embodiment.

In an embodiment, a method for processing a system call in a voice call is further correspondingly provided, as shown in FIG. 9. The method is operated at a calling party terminal, and the calling party terminal performs a voice call with a calling party terminal on which a system call start event occurs. The method further includes the following steps.

Step S810: Receive a prompting message that the calling party terminal suspends the call, and trigger, by the calling party terminal that suspends the call, the system call start event.

When a calling party terminal enters a system call and holds the voice call, other calling party terminals receive the prompting message that the calling party terminal suspends the call, so as to learn that a calling party terminal in the currently performed voice call enters the system call.

Step S830: Remind, according to the prompting message that the calling party terminal suspends the call, that the calling party terminal suspends the call.

Corresponding reminding content is output in the currently performed voice call according to the received prompting message, and an output form is consistent with a form of the prompting message. For example, if the prompting message is a text message, the prompting message is displayed in the current voice call interface, as shown in FIG. 9; and the voice call interface 710 displays reminding content of "bob enters a common call". If the prompting message is an audio message, a set reminder is directly played.

Step S850: Perform the voice call under a reminder that the calling party terminal suspends the call.

Under this reminder, other than the calling party terminal that enters the system call, the other calling party terminals perform the voice call with each other in normal voice call logic. That is, audio data is sent and/or received under cooperation of the server device.

Further, a specific process of step S850 may be: sending the voice data in the voice call to the server device and/or receiving the voice data in the voice call by the server device, where the voice data is forwarded by using the server device to the other calling party terminals other than the calling party terminal that suspends the call in the voice call.

That is, during a process that a calling party terminal enters the system call and holds the voice call, the calling party terminal no longer sends and/or receives the voice data, but the voice data is continue to be sent and/or received among the other calling party terminals.

Figure 11:
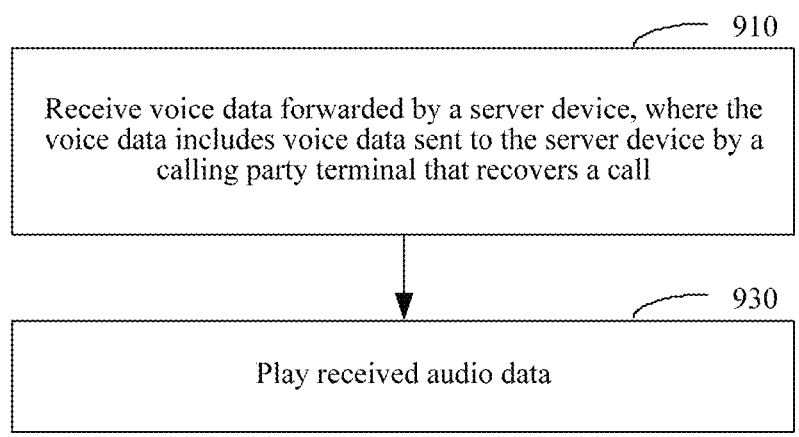
FIG. 11 is a flowchart of a method for processing a system call in a voice call according to another embodiment.

In another embodiment, as shown in FIG. 11, the method for processing a system call in a voice call further includes the following steps.

Step S910: Receive the voice data forwarded by the server device, where the voice data includes voice data sent to the server device by the calling party terminal that recovers the call.

In the foregoing process that a calling party terminal enters the system call and holds the voice call, the voice data is transferred among the other calling party terminals, so as to achieve a normal voice call among the other calling party terminals.

When the system call ends and the voice call is recovered, the calling party terminal sends the voice data to the server device, so as to participate in the voice call among the other calling party terminals.

Step S930: Play received audio data.

After the other calling party terminals receive the voice data that is sent to the server device by the calling party terminal that recovers the call, the received audio data may be played by the occupied audio device, so as to obtain the speaking content.

Through the foregoing process, as a calling party terminal ends the system call and recovers the voice call, the calling party terminal enters the voice call among the other calling party terminals, so as to recover the normal voice call among multiple calling party terminals.

During this process, logic corresponding to the calling party terminal on which a system call occurs is as stated above, and details are not described herein again.

Figure 12:
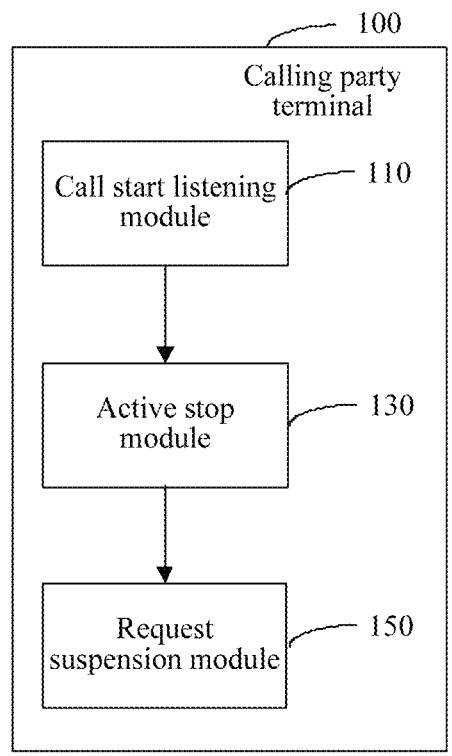
FIG. 12 is a schematic structural diagram of a system for processing a system call in a voice call according to an embodiment.

In an embodiment, a system for processing a system call in a voice call is correspondingly provided, as shown in FIG. 12. The system includes a call start listening module 110, an active stop module 130, and a request suspension module 150.

The call start listening module 110 is configured to listen for a system call start event at any calling party terminal 100 of a voice call.

The active stop module 130 is configured to actively stop, according to the system call start event, use of an audio device of the calling party terminal by the calling party terminal, so as to suspend, in the voice call, participation of the calling party terminal 100 at which the active stop module is located.

The request suspension module 150 is configured to initiate, in the calling party terminal that suspends the calling party terminal, a voice suspension request to a server, so as to remind, by using the server device, other calling party terminals that the calling party terminal 100 suspends the voice call.

The voice call suspended by the calling party terminal is recovered when the system call ends.

In this embodiment, the call start listening module 110, the active stop module 130, and the request suspension module 150 are all disposed in the calling party terminal 100 on which the system call occurs, that is, constitute functional modules of a voice call application on which a system call occurs.

The system may further include a sending stop module (not shown in the figure). The sending stop module is configured to trigger, by using the system call start event, to stop sending voice data, where the voice data is generated when the first calling party terminal performs the voice call.

In an embodiment, the system described above further includes a reminder module. The reminder module is configured to remind, in the server device and according to the received voice suspension request, other calling party terminals that participation of a calling party terminal in the voice call is suspended.

The reminder module is disposed in the server device performing data exchange with multiple calling party terminals, thereby cooperating with the server device to control the voice call performed by the multiple calling party terminals.

Figure 13:
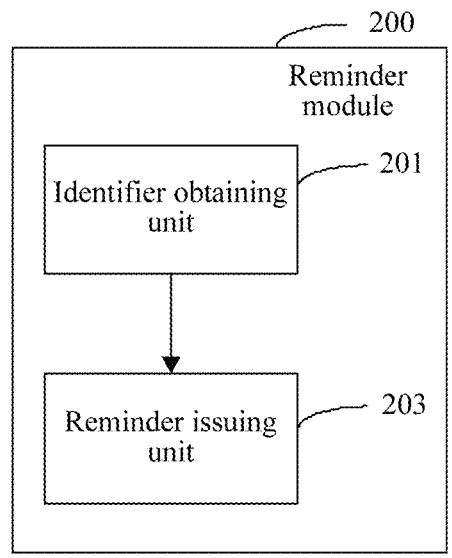
FIG. 13 is a schematic structural diagram of a reminder module according to an embodiment.

Further, as shown in FIG. 13, a reminder module 200 includes an identifier obtaining unit 201 and a reminder issuing unit 203.

The identifier obtaining unit 201 is configured to trigger to obtain, according to the received voice suspension request, identifiers corresponding to the other calling party terminals in the voice call.

The reminder issuing unit 203 is configured to generate a prompting message that the participation of a calling party terminal in the voice call is suspended, and issue, according to the identifiers, the prompting message to the other calling party terminals.

Figure 14:
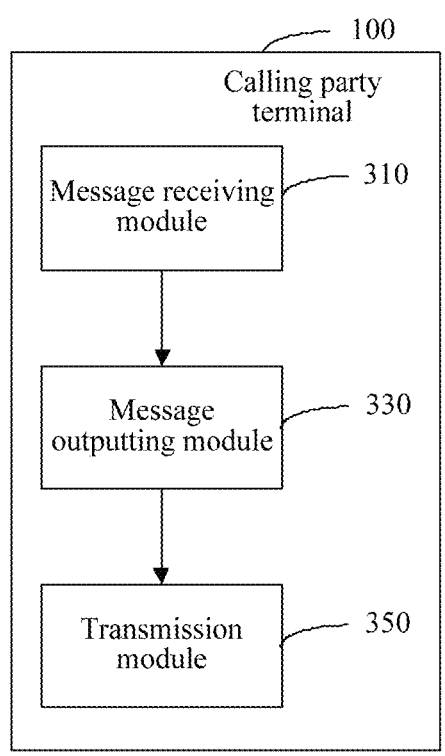
FIG. 14 is a schematic structural diagram of a system for processing a system call in a voice call according to another embodiment.

In an embodiment, as shown in FIG. 14, the system further includes a message receiving module 310, a message outputting module 330, and a transmission module 350.

The message receiving module 310 is configured to receive, at any calling party terminal that performs the voice call with a calling party terminal on which the system call start event occurs, the prompting message that the calling party terminal suspends the call.

The message outputting module 330 is configured to remind, according to the prompting message, that the calling party terminal suspends the call.

The transmission module 350 is configured to send and/or receive the voice data under a reminder that the calling party terminal suspends the call.

In this embodiment, the message receiving module 310, the message outputting module 330, and the transmission module 350 are all disposed in other calling party terminals, and are opposite to the calling party terminal on which the system call start event occurs.

Figure 15:
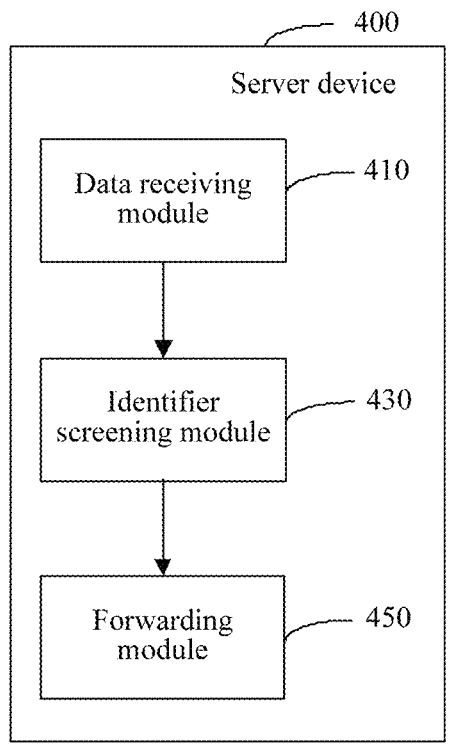
FIG. 15 is a schematic structural diagram of a system for processing a system call in a voice call according to another embodiment.

In an embodiment, as shown in FIG. 15, the system described above further includes a data receiving module 410, an identifier screening module 430, and a forwarding module 450.

The data receiving module 410 is configured to receive, in a server device 400, the voice data sent by any calling party terminal in the voice call.

The identifier screening module 430 is configured to obtain identifiers corresponding to the calling party terminals that receive the voice data, and remove, in the obtained identifiers and according to the voice suspension request, the identifier of the calling party terminal that suspends the participation in the voice call.

The forwarding module 450 is configured to forward the voice data according to the obtained identifiers.

In this embodiment, the data receiving module 410, the identifier screening module 430, and the forwarding module 450 are all disposed in the server device 400.

Figure 16:
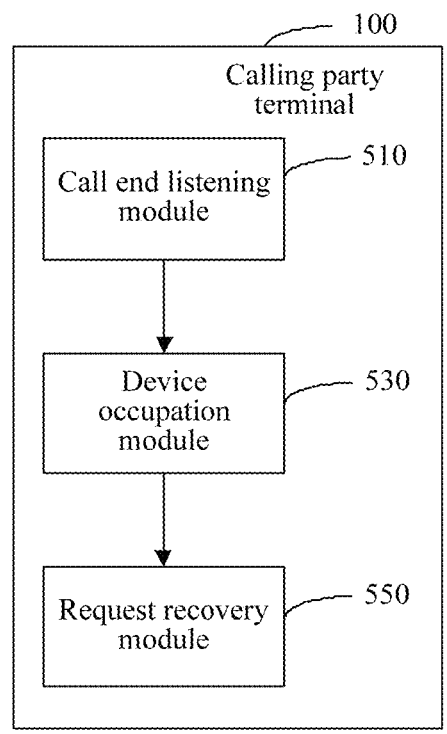
FIG. 16 is a schematic structural diagram of a system for processing a system call in a voice call according to another embodiment.

In another embodiment, as shown in FIG. 16, the system described above further includes a call end listening module 510, a device occupation module 530, and a request recovery module 550.

The call end listening module 510 is configured to listen and obtain a system call end event at the calling party terminal that suspends the voice call.

The device occupation module 530 is configured to reoccupy the audio device according to the system call end event, to recover the call.

The request recovery module 550 is configured to initiate a call recovery request to the server device according to the recovery of the call, so as to notify, by using the server device, other calling party terminals that the calling party terminal that suspends the voice call recovers the voice call.

In this embodiment, the call end listening module 510, the device occupation module 530, and the request recovery module 550 are disposed in the calling party terminal of the system call, so as to recover the suspended voice call.

Figure 17:
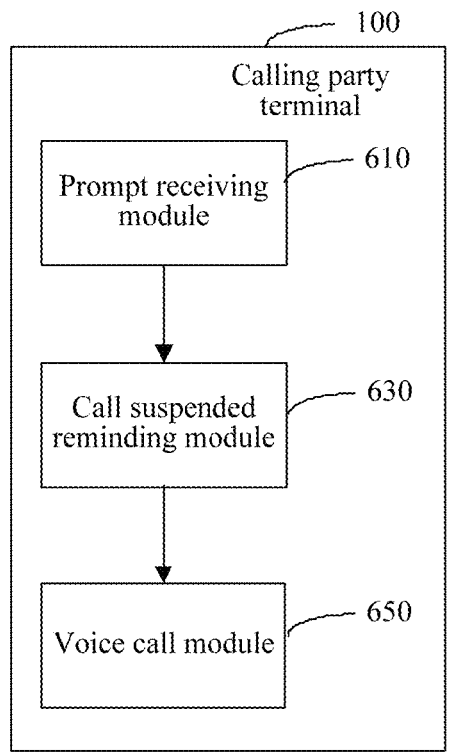
FIG. 17 is a schematic structural diagram of a device for processing a system call in a voice call according to an embodiment.

In an embodiment, a device for processing a system call in a voice call is correspondingly provided. The device is operated at a calling party terminal. The calling party terminal performs a voice call with a calling party terminal on which a system call start event occurs. As shown in FIG. 17, the device includes a prompt receiving module 610, a call suspended reminding module 630, and a voice call module 650.

The prompt receiving module 610 is configured to receive a prompting message that the calling party terminal suspends the call, and trigger, by the calling party terminal that suspends the call, the system call start event.

the call suspended reminding module 630 is configured to remind, according to the prompting message that the calling party terminal suspends the call, that the calling party terminal suspends the call.

The voice call module 650 is configured to perform the voice call under a reminder that the calling party terminal suspends the call.

Further, the voice call module 650 is further configured to send voice data in the voice call to the server device and/or receive the voice data in the voice call by the server device, where the voice data is forwarded by using the server device to the other calling party terminals other than the calling party terminal that suspends the call in the voice call.

Figure 18:
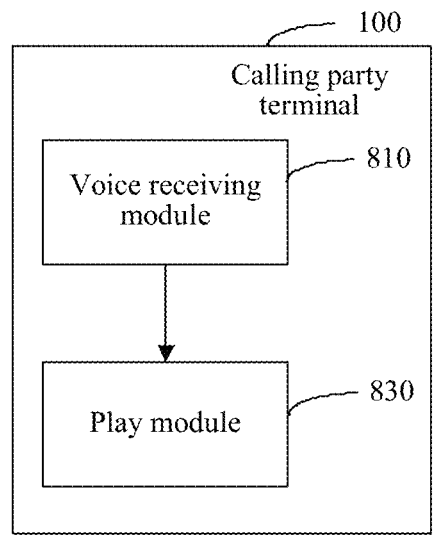
FIG. 18 is a schematic structural diagram of a device for processing a system call in a voice call according to another embodiment.

In another embodiment, as shown in FIG. 18, the device described above further includes a voice receiving module 810 and a play module 830.

The voice receiving module 810 is configured to receive the voice data forwarded by the server device, where the voice data includes voice data sent to the server device by the calling party terminal that recovers the call.

The play module 830 is configured to play the received voice data.

In this application, in a voice call of multiple parties, for example, a voice call performed by two or more people by using a mobile terminal, the voice call performed by any calling party terminal occupies an audio device. Use of the audio device is actively stopped if a system call start event is listened, so as to suspend the voice call of the calling party terminal. A voice suspension request is initiated to a background server device. Other calling party terminals in the voice call are reminded by using the server device that the calling party terminal suspends the voice call, and the other calling party terminals still send and receive voice data in this voice call. During this process, the voice call does not end as the system call occurs, but merely participation in the voice call of the calling party terminal entering the system call is suspended. The other calling party terminals can still continue to perform the voice call, so as to ensure smooth of the voice call. Therefore, the voice call of multiple parties is not interfered, thereby improving reliability of the voice call of multiple parties.

A method for processing a system call in a voice call provided in this embodiment is implemented by a computer program. The system and device for processing a system call in a voice call are stored in a computer system 900 shown in FIG. 19, so as to run in the computer system 900.

If a calling party terminal that listens for a system call start event in the foregoing embodiments is referred to as a first calling party terminal, and a calling party terminal performing voice communication with the first calling party terminal is referred to as a second calling party terminal, the foregoing computer system 900 may be configured to implement the first calling party terminal, or a server device, or the second calling party terminal, or a system for processing a system call in a voice call. The processing system includes one first calling party terminal, one server device, and at least one second calling party terminal.

Figure 19:
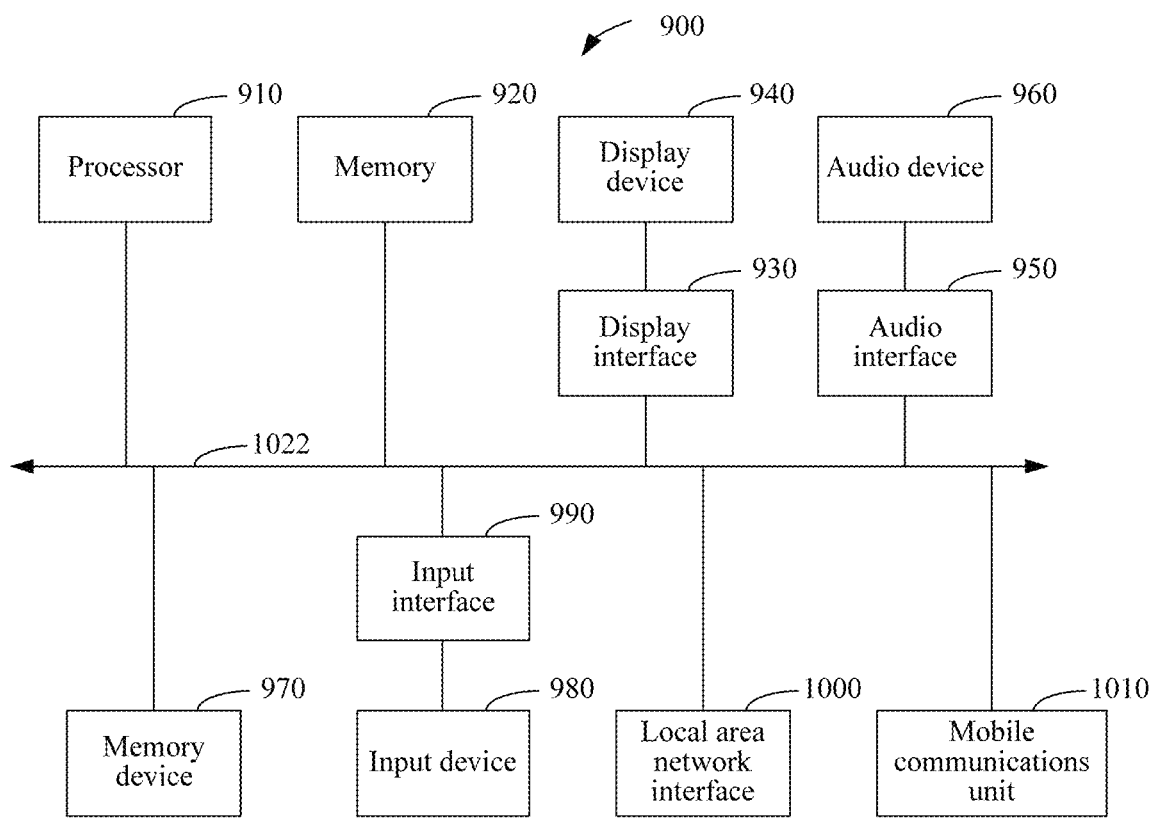
FIG. 19 is a schematic structural diagram of a mobile terminal according to an embodiment of the present disclosure.

As shown in FIG. 19, the computer system 900 includes a processor 910, a memory 920, and a system bus 922. Various system components including the memory 920 and the processor 910 are connected to the system bus 922. The processor 910 is hardware for executing computer program instructions by means of basic arithmetic and logic operations in the computer system. The memory 920 is a physical device for temporarily or permanently storing computer programs or data (for example, program state information), and stores program instructions and other data of a method for processing a system call in a voice call. The processor 910 executes the program instructions in the memory 920, listens for state changes of a system call, and responds to the system call, so as to suspend or recover a voice call. The processor 910 and the memory 920 can perform data communication through the system bus 922. The memory 920 includes a read-only memory (ROM) or a flash memory (both not shown), and a random access memory (RAM), where the RAM generally refers to main memory loaded with an operating system and application programs.

The computer system 900 further includes a display interface 930 (for example, a graphics processing unit), a display device 940 (for example, a liquid crystal display), an audio interface 950 (for example, a sound card), and an audio device 960 (for example, a speaker). The display device 940 is configured to display a voice call interface.

The computer system 900 generally includes one storage device 970. The storage device 970 may be selected from multiple types of computer readable media. The computer readable media refer to any available media that can be accessed by the computer system 900, and include removable media and non-removable media. For example, the computer readable media include, but not limited to, a flash memory (micro SD card), a CD-ROM, a digital versatile disc (DVD) or other optical storage, a cassette, a magnetic tape, a disk storage or other magnetic storage devices, or any other media that can be used to store required information and can be accessed by the computer system 900.

The computer system 900 further includes an input device 980 and an input interface 990 (for example, an IO controller). A user may input an instruction and information into the computer system 900 by using the input device 980, such as a keyboard, a mouse, or a touch panel device on the display device 940. The input device 980 is generally connected to the system bus 922 through the input interface 990, but may also be connected through other interfaces or bus structures, such as a universal serial bus (USB).

The computer system 900 may be logically connected to one or more network devices in a network environment. The network device may be a personal computer, a server device, a router, a smartphone, a tablet computer, or other public network nodes. The computer system 900 is connected to the network device through a local area network (LAN) interface 1000 or a mobile communications unit 1010. A local area network (LAN) refers to an interconnected computer network in a limited area such as a family, a school, a computer laboratory, or an office building using network media. WiFi and Ethernet over twisted pair are the most commonly used two technologies for building a local area network. WiFi is a technology that enables the computer systems 900 to exchange data or to be connected to a wireless network through radio waves. The mobile communications unit 1010 is capable of making and receiving calls through radio communications lines while moving in a broad geographic area. In addition to calling, the mobile communications unit 1010 also supports Internet access in a 2G, 3G, or 4G cellular communications system that provides mobile data services.

As described above in detail, the computer system 900 applicable to the present disclosure can execute specified operations processed by the system call in the foregoing voice call. The computer system 900 executes these operations in the form of running program instructions in the computer readable media by the processor 910. These program instructions may be read into the memory 920 from the storage device 970 or from another device through the local area network interface 1000. The program instructions stored in the memory 920 enable the processor 910 to execute the image processing method. Moreover, this application may also be implemented by using a hardware circuit or by using a combination of a hardware circuit and software instructions. Therefore, the implementation of this application is not limited to any particular combination of a hardware circuit and software.

When the foregoing computer system 900 is configured to implement the first calling party terminal, the memory 120 stores at least a call start listening module, an active stop module, a request suspension module, a call end listening module, a device occupation module, and a request recovery module. The memory 120 may further include a sending stop module. When implemented by the processor 110, functions completed by various modules are same to those in the foregoing embodiments, and details are not described herein again.

When the foregoing computer system 900 is configured to implement the server device, the memory 120 stores at least a reminder module, a data receiving module, an identifier screening module, and a forwarding module. When implemented by the processor 110, functions completed by various modules are same to those in the foregoing embodiments, and details are not described herein again.

When the foregoing computer system 900 is configured to implement the second calling party terminal, the memory 120 stores at least a message receiving module, a message outputting module, and a transmission module. When implemented by the processor 110, functions completed by various modules are same to those in the foregoing embodiments, and details are not described herein again.

When the foregoing computer system 900 is configured to implement a system including the first calling party terminal, the server device, and the at least one second calling party terminal, the memory 120 separately stores various modules for implementing the first calling party terminal, the server device, and each second calling party terminal. When implemented by the processor 110, functions completed by various modules are same to those in the foregoing embodiments, and details are not described herein again.

The foregoing computer system 900 is merely an example of computer system environments applicable to this application, and should not be construed as any limitation on the application scope of this application. The computer system 900 also should not be interpreted as needing to rely on or have one or a combination of parts of the exemplary computer system 900.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

What is claimed is:

1. A method for processing a system call in a voice call, comprising:
    participating, by a first terminal, in the voice call with one or more second terminals, the voice call being performed in a non-system voice call application on the first terminal;
    monitoring, by the first terminal, a system call start event during the voice call;
    actively stopping, in response to the system call start event, use of an audio device of the first terminal;
    engaging, by the first terminal, in the system call with a system call terminal different than the one or more second terminals, while having participation of the first terminal in the voice call suspended;
    in response to engaging in the system call, rendering inactive, by the first terminal, a recovery button presented on an interface of the first terminal to prevent recovering the voice call while the system call is in session;
    sending, by the first terminal, a voice suspension request to a server to remind the one or more second terminals that the first terminal suspends the voice call;
    facilitating, by the first terminal, display of a notification on a second interface of the one or more second terminals, the notification indicating that the system call is in session at the first terminal; and
    recovering, by the first terminal, the voice call when after the system call ends by activating the recovery button.

2. The method according to claim 1, further comprising:
triggering, in response to the system call start event, to stop sending voice data, wherein the voice data is generated when the first terminal performs the voice call.

3. The method according to claim 1, further comprising:
monitoring, by the first terminal that suspends the voice call, a system call end event;
reoccupying, by the non-system voice call application in response to the system call end event, the audio device to recover the voice call; and
initiating, by the first terminal, a call recovery request to the server to notify the one or more second terminals that the first terminal recovers the voice call.

4. The method according to claim 1, further comprising:
receiving, during the voice call from the server, a prompting message indicating that a third terminal suspends the voice call, the third terminal being one of the one or more second terminals;
presenting, according to the prompting message, a reminder that the third terminal suspends the voice call; and
participating, by the first terminal, the voice call under the reminder that the third terminal suspends the voice call.

5. The method according to claim 4, wherein the step of participating the voice call under the reminder comprises:
sending and receiving voice data in the voice call, wherein the voice data is forwarded by the server to or from the one or more second terminals in the voice call other than the third terminal.

6. The method according to claim 4, further comprising:
receiving voice data forwarded by the server, wherein the voice data includes first voice data sent to the server by the third terminal; and
playing the voice data as received.

7. The method according to claim 1, further comprising:
prior to the system call start event, presenting the first interface at the first terminal, the first interface showing identification of the one or more second terminals in the voice call; and
continuing to present the first interface at the first terminal while the system call is in session.

8. A method for processing a voice call, comprising:
facilitating, by a server, the voice call between a first terminal and one or more second terminals;
receiving, by the server, a voice suspension request from the first terminal, the voice suspension request being generated by the first terminal in response to a system call start event;
reminding, by the server, according to the voice suspension request as received, the one or more second terminals that participation of the first terminal in the voice call is suspended while the first terminal is engaging in the system call with a system call terminal different than the one or more second terminals;
in response to engaging of the first terminal in the system call, facilitating rendering inactive a recovery button presented on an interface of the first terminal to prevent recovering the voice call while the system call is in session at the first terminal; and
facilitating, by the server, presentation of a notification on a second interface of the one or more second terminals, the notification indicating of a notification that the system call is in session at the first terminal.

9. The method according to claim 7, further comprising:
obtaining, by the server according to the voice suspension request as received, identifiers corresponding to the one or more second terminals in the voice call;
generating a prompting message indicating that the participation of the first terminal in the voice call is suspended; and
issuing the prompting message to the one or more second terminals according to the identifiers.

10. The method according to claim 7, further comprising:
prior to the system call start event, presenting the first interface at the first terminal, the first interface showing identification of the one or more second terminals in the voice call; and
continuing to present the first interface at the first terminal while the system call is in session.

11. A first terminal for processing a system call in a voice call, comprising: an audio device; an interface; a memory; and a processor coupled to the memory, the processor being configured for:
participating in a voice call with one or more second terminals, the voice call being performed in a non-system voice call application on the first terminal;
monitoring a system call start event during the voice call;
actively stopping, in response to the system call start event, use of the audio device of the first terminal;
engaging in the system call with a system call terminal different than the one or more second terminals, while having participation of the first terminal in the voice call suspended;
in response to engaging in the system call, rendering inactive a recovery button presented on the interface to prevent recovering the voice call while the system call is in session;
sending a voice suspension request to a server to remind the one or more second terminals that the first terminal suspends the voice call;
facilitating presentation of a notification on a second interface of the one or more second terminals, the notification indicating that the system call is in session at the first terminal; and
recovering the voice call after the system call ends by activating the recovery button.

12. The terminal according to claim 11, wherein the processor is further configured for:
triggering, in response to the system call start event, to stop sending voice data, wherein the voice data is generated when the first terminal performs the voice call.

13. The terminal according to claim 11, wherein the processor is further configured for:
monitoring, after the voice call is suspended, a system call end event;
reoccupying, by the non-system voice call application in response to the system call end event, the audio device to recover the voice call; and
initiating a call recovery request to the server to notify the one or more second terminals that the first terminal recovers the voice call.

14. The terminal according to claim 11, wherein the processor is further configured for:
receiving, during the voice call from the server, a prompting message indicating that a third terminal suspends the voice call, the third terminal being one of the one or more second terminals;
presenting, according to the prompting message, a reminder that the third terminal suspends the voice call; and participating, by the first terminal, the voice call under the reminder that the third terminal suspends the voice call.

15. The terminal according to claim 14, wherein the processor is further configured for:
sending and receiving voice data in the voice call, wherein the voice data is forwarded by the server to or from the one or more second terminals in the voice call other than the third terminal.

16. The terminal according to claim 14, wherein the processor is further configured for:
receiving voice data forwarded by the server, wherein the voice data including first voice data sent to the server by the third terminal; and playing the received voice data.

* * * * *